United States Patent [19]
DePaul

[11] Patent Number: 4,841,473
[45] Date of Patent: Jun. 20, 1989

[54] COMPUTER ARCHITECTURE PROVIDING PROGRAMMABLE DEGREES OF AN ALMOST CONDITION

[75] Inventor: Albert D. DePaul, New York, N.Y.

[73] Assignee: Robert S. Salzman, Millington, N.J.

[21] Appl. No.: 943,424

[22] Filed: Dec. 19, 1986

[51] Int. Cl.⁴ .................. G06K 9/68; G06F 7/22; H04N 5/14

[52] U.S. Cl. .................. 364/900; 358/160; 382/34; 382/27

[58] Field of Search ... 364/200 MS File, 900 MS File; 382/27, 13, 38, 34, 22, 48, 54, 30; 340/146.3

[56] References Cited

U.S. PATENT DOCUMENTS

| | | | |
|---|---|---|---|
| 4,227,175 | 10/1980 | Newman | 382/34 |
| 4,277,775 | 7/1981 | Nally et al. | 382/34 |
| 4,288,782 | 9/1981 | Bader et al. | 340/146.3 |
| 4,490,850 | 12/1984 | Nally et al. | 382/34 |
| 4,521,909 | 6/1985 | Wang | 382/38 |
| 4,532,504 | 7/1985 | Fisher | 340/739 |
| 4,570,181 | 2/1986 | Yamamura | 382/48 |
| 4,589,034 | 5/1986 | Yokomizo | 382/54 |
| 4,606,069 | 8/1986 | Johnsen | 382/34 |
| 4,630,308 | 12/1986 | Hongo | 382/30 |
| 4,648,119 | 3/1988 | Wingfield et al. | 382/27 |
| 4,680,805 | 7/1987 | Scott | 382/22 |
| 4,700,400 | 10/1987 | Ross | 382/27 |
| 4,718,102 | 1/1988 | Crane et al. | 382/13 |
| 4,747,072 | 5/1988 | Robinson et al. | 364/900 |

Primary Examiner—Gareth D. Shaw
Assistant Examiner—Viet O. Nguyen
Attorney, Agent, or Firm—Robert S. Salzman

[57] ABSTRACT

This invention features a new computer system architecture comprising a variable comparison of input data with programmable Template data. The system has the capability to provide an "almost" condition, which is a similarity match between a near or close actual data and the "exact" data stored in template memory. Different degree levels of "almost" are possible with the inventive system.

22 Claims, 7 Drawing Sheets

COMPUTER ARCHITECTURE PROVIDING PROGRAMMABLE DEGREES OF AN ALMOST CONDITION

FIELD OF THE INVENTION

The invention relates to a new computer architecture and method of computing, and more particularly to a new computer system that has the capability to process data on an all-at-once basis independent of the processor bus size.

BACKGROUND OF THE INVENTION

This invention features Multi-Dimensional Processing, which is an improvement in the basic computer architecture. It involves increased throughout by simultaneous or parallel operations on large amounts of data at a very high rate of speed.

Cuurent computer architectures follow a serial path of executed operations on a serially structured group of operands, and serially compute one answer to a given problem at one time. Many variations of this type of architecture are currently being explored. The goal of increased computational speed is largely thought to be possible by implementing multiple processors within one computer's architecture, with each processor operating on a separate segment of an overall process, thus achieving an answer to the problem in a much smaller time period. The complexity of the programming and hardware in a system of this type is very, very large, and involves a complete re-thinking of the computing process in general. Multi-Dimensional Processing, however, retains the traditional serial execution mode of operation, using one processor, with the exception that large amounts of data are operated on simultaneously. With the coming of "Artifical Intelligence" or "Machine Thought" terminology, the tasks of computers have changed from a "computationally intensive" environment, to one of "comparison intensive" tasks, involving huge data bases. These data bases might, for instance, contain textual information, such as in a "Rule Based Expert System," or possible large amounts of "Real Time" sampled numeric values, as relates to an Image or Sound Recognition system. Very large quantities of serially executed, consecutive comparisons must be made between the input data and the huge amount of data stored within the computers memory, such as Templates and/or "Real Time" sampled numeric quantities. This type of system is trying to mimic the human mind. This can only be accomplished, however, if the computer has the ability to "think" artificially via "snapshot" or "all at once" type data imaging.

The Multi-Dimensional Processing of this invention accomplishes this goal by introducing two new elements into the computer's basic architecture: First, data is reduced to its "lowest common denominator" and stored in a long, parallel memory chain. Second, a Variable Comparator, a new element unknown to computing science, is utilized. A Variable Comparable denotes programmable degrees of the "almost" condition. The two aforementioned archiectectural changes combined together, produce a new computer system truly capable of emulating human thought. This Multi-Dimensional Processing system running on a one megahertz clock can look at one million images per second, with full ability to recognize "close" or "almost" matches. The computer suddenly has the ability to estimate answers to questions with a very high degree of accuracy.

BRIEF SUMMARY OF THE INVENTION

Utilizing Template Matching, which most often relates to Image and Voice Recognition, exact pattern matches between input bit patterns and template bit patterns have been the only way of achieving a "pattern match" condition. It is this very rule of "exact matches" that hinders the computing process from recognizing "close," but one "exact" matches. Due to this effect, for example, one dropped bit out of a template of 64 or more bits, can cause a "no match" condition, when indeed a match should have been detected. By using a Variable Comparator, Template Matching is allowed to easily distinguish both "close" and "exact" matches, thereby rendering a more forgiving, yet practical means of comparing two entities to each other.

The computer of the invention comprises as a basic system in an architectural array, a processor having a data input and an address/data output. Operatively connected to the processor is a first set of memories for receiving the input data. This first set of memories has separate data inputs, but shares common addressing.

In parallel with the first set of memories is a second set of Template memories containing programmable data which is to be matched with the input data in a simultaneous, "snapshot" manner. Template memory can be either a read-only memory, or a read-write memory, and in some instances a combination of both read-only and read-write memories.

A set of Variable Comparators, each of which can be constructed from standard electronic parts, and which will be described in greater detail hereinafter, is operatively connected to the first and second sets of memories. The variable Comparators process the data in each of the sets of memory to provide a set of data signals, each signal of which comprises two least significant bits of data.

Clocked address counter logic is operatively connected to the processor and the Template memories for generating sequential addresses for the Template memories, and an end-of-address-range signal for the processor.

Decoding logic operatively connected to the Variable Comparators and communicating with the processor and address counter logic, receives and decodes the data signals from the Variable Comparators. The decoding logic provides comparison signals for the processor and address counter logic.

A storage device communicates with the processor and address counter logic and stores a generated address indicative of a match condition in the Template memories for interrogation by the processor.

The basic computer system can simultaneously compare input data or information with stored data or information independent of processor bus size.

The basic computer system can be configured into an array to provide Multi-Dimensional Processing. Each array can have its own processor, with a master processor controlling each array, or the master processor can be the control for all of the array.

The Variable Comparators and decoding logic generate signals indicative of several match conditions: (a) exact match; (b) no match; and (c) at least two different "almost" match conditions. The "almost" match conditions can be programmably set to indicate an "almost" match when different degrees of similarity are present between the input and stored data. For example, one "almost" match condition can require matching bits in excess of ninety percent (90,), while another "almost" match may be programmed to be more forgiving such as eighty percent (80%), or less forgiving, such as ninety-five percent (95%).

Expanded systems may be configured to provide a whole range of "almost" match condition indications.

Whole groups of data may be simultaneously processed, or the groups of bits may themselves be broken-up into sub-groups that are simultaneously compared.

It is an object of the invention to provide a new computer architecture.

It is another object of this invention to provide a computer system having a Variable Comparator for indicating an "almost" match condition.

It is a further object of the invention to provide an array for Multi-Dimensional Processing of large quantities of information or data simultaneously.

These and other objects of this invention will be better understood and shall become more apparent with reference to the following detailed description considered in conjunction with the accompanying drawings.

DETAILED DESCRIPTION OF THE INVENTION

Generally speaking, the invention features a new computer architecture for performing a process of variable comparison between input data and stored data to provide a programmable degree of "almost" condition. Bytes of input data are divided into groups of bits. These bits are compared with bits of Template memory data bits for generating at least two bits indicative of one of at least four match conditions, comprising: (i) identical match; (ii) no match; and (iii) two different "almost" match conditions.

Figure 1:
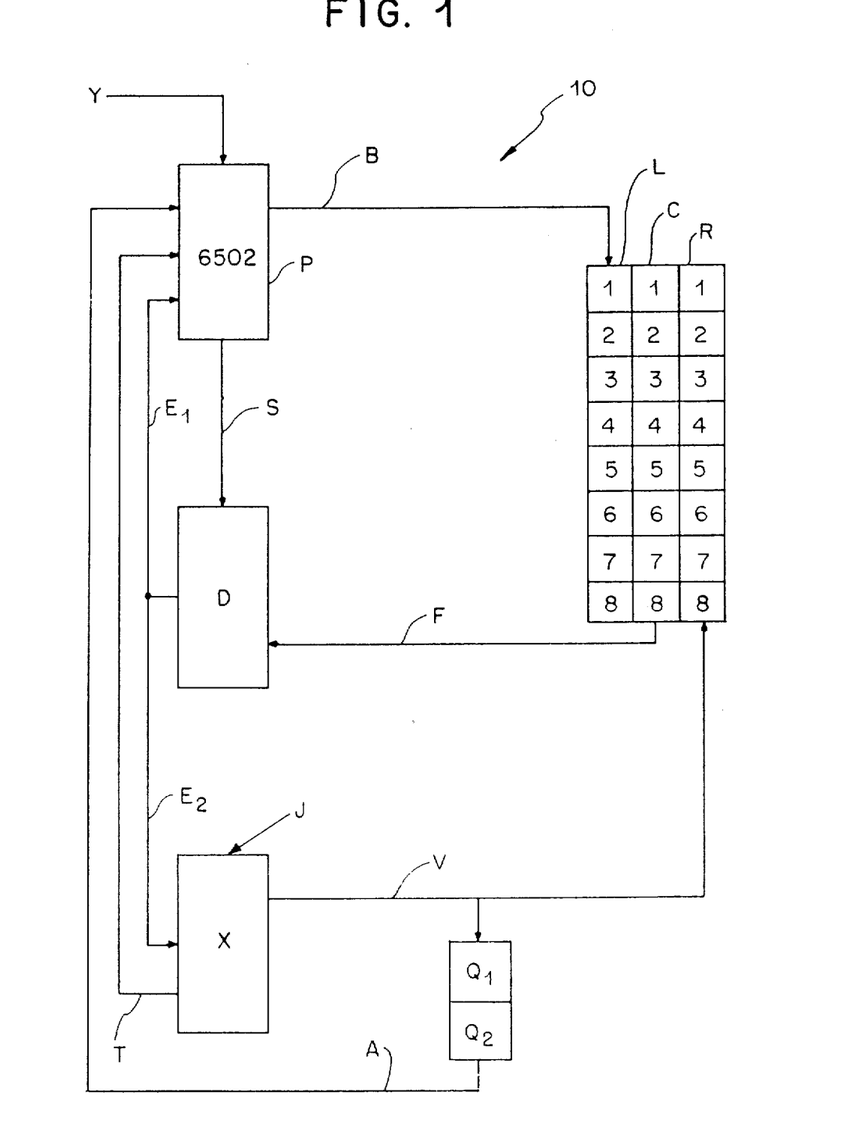
FIG. 1 shows a block diagram of the bsic computer system architecture of the invention.

Now referring to FIG. 1, a block diagram is illustrated for the basic computer system architecture 10 of this invention. The architectural system 10 for illustrative and exemplary purposes, processes data eight (8) bits wide.

The processor P of the system 10 is a microprocessor 6502, which feeds and loads data or information bits to a set of individual eight (8) bit memory devices L, numbered one through eight, by virtue of data bus B emanating from microprocessor P.

Figure 3:
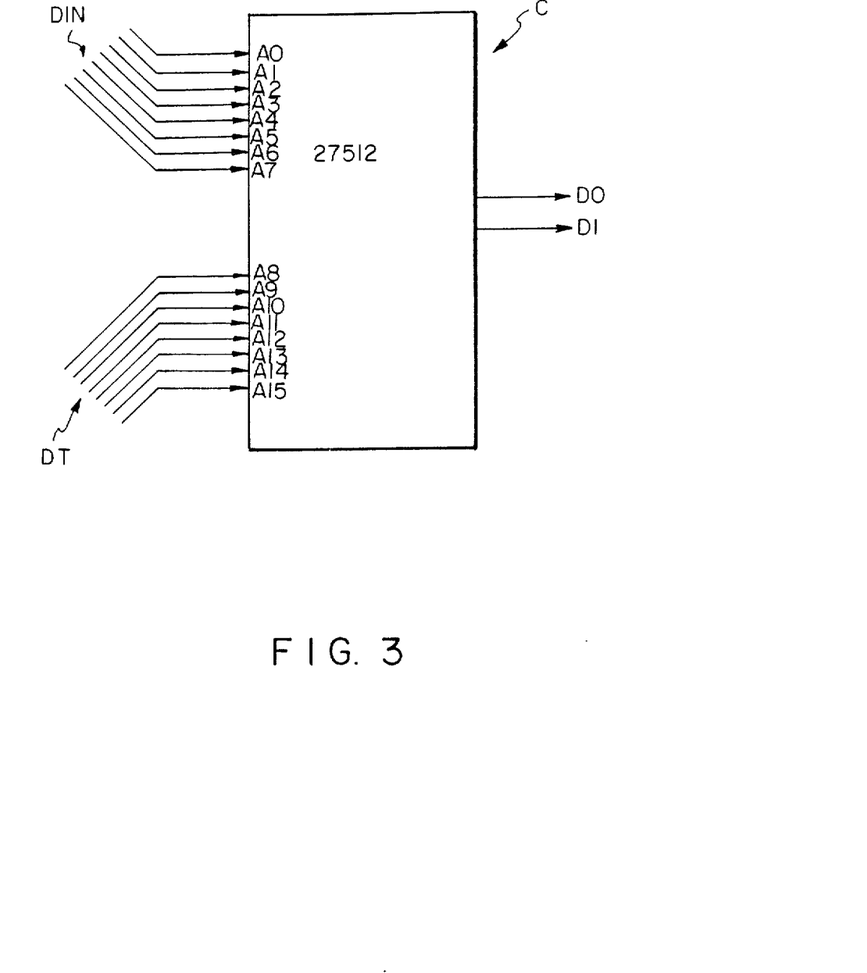
FIG. 3 illustrates a diagram of a programmable read-only memory configured to provide a Variable Comparator function in keeping with the new computer architecture shown in FIG. 1.

The set of Variable Comparators C, numbered one through eight, has one set of inputs, the data held in memory devices L. A typical Variable Comparator C is illustrated in FIG. 3, and will be described in more detail hereinafter.

A set of Template memories R, numbered one through eight have been preprogrammed with matching data specifically to the application at hand, for example, the Visual recognition of a given character or letter, such as the letter "P".

The Template memories R are preprogrammed with data bits indicative of the letter "P". The outputs of the memories R are the other set of inputs to the Variable Comparators C.

Variable Comparators C have as their function to match both groups of bits from memories R and L, respectively, to provide signals indicative of one of several match conditions, at least two of which are different degrees of "almost".

Comparator decoding logic D receives eight sets of signals from the eight sets of comparators C over data bus F.

The comparator decoding logic D, which will be described in more detail hereinafter, with reference to FIG. 5, decodes the eight (8) sets of signals consisting of two (2) data bits. The comparator decoding logic D processes these eight sets of (two bit) signals, and provides a two bit binary code representative of the comparison performed by the Variable Comparators C.

This code is fed via bus El to the processor P, and to address counter logic X, via bus E2.

The address counter logic X is clocked by a 1 megahertz signal J, for example, for the purpose of generating sequential addresses for the Template memories R via bus V, and also of latches Q1 and Q2, respectively. The latches Q1 and Q2 store the currently generated addresses for Template memories R for interrogation by processor P via bus A.

An end-of-address-range signal from address counter logic X is sent to processor P over bus T. The end-of-address-range signal indicates that all the comparison addresses have been generated, for the match condition wherein "no match" has been found.

The input data for comparison is introduced to processor P over data bus Y.

The control bus S between the processor P and comparator decoding logic D, conveys control signals from the processor P to the comparator decoding logic D to set the operational mode for the task at hand.

The decoding logic D may be instructed to stop the comparison process and inform the processor P via bus E at a given percentage of match condition, such as a 75% of match, or a 50% of match, or when an exact match is found. The processor P will then issue a "Continue" command via bus S, or conclude the comparison process.

OPERATION OF THE COMPUTER SYSTEM

Figure 2:
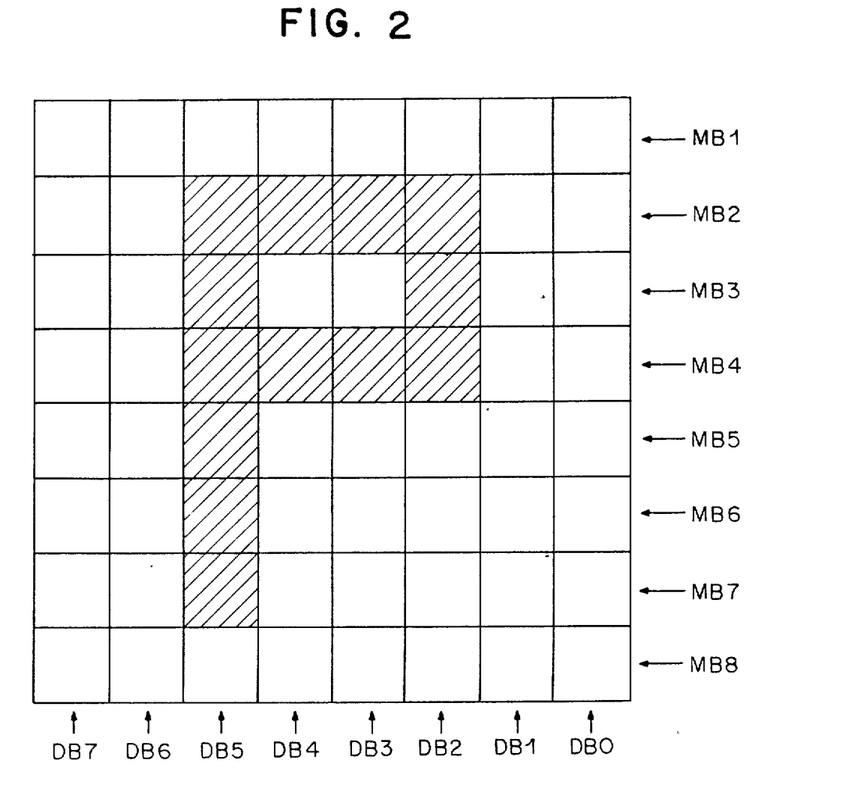
FIG. 2 depicts a diagram of a byte matrix written in pixel form for a letter "P", as an illustrative example of data matching to be considered in conjunction with FIG. 6 which shows three different match conditions compared to the "P" of the matrix of FIG. 2.

Referring to FIG. 1, at the start of a comparison cycle, the following chain of events would occur:

Processor P would be loaded via bus Y with 8 bytes of data representing a letter "P" as detailed in FIG. 2. FIG. 2 shows an 8 bit by 8 byte matrix wherein the letter "P" has been written in bit or pixel form. MB1 thru MB8 represent 8 bytes of data of which each byte is made up of 8 bits denoted DB 0 through DB 7. This matrix represents an image scan of the letter "P" in a binary bit form. The task at hand represents one of character recognition, whereby the processor P has been asked to identify the data fed via bus Y, by searching through its eight Template Memories R, and finding a satisfactory match up to the input data. The Memory R templates in this case for the letter "P", would be filled with various fonts and styles of alphabetic characters. Processor P would now load the 8 bytes of data representing FIG. 2 into the eight memories L in a parallel address format. Parallel address format relates to the fact that each byte or segment of FIG. 2 is loaded into a separate memory so that the entire image is presented to the eight Variable Comparators C in one read cycle such as in "snapshot" or parallel fashion, as opposed to the standard processing of presenting one pixel at a time sequentially. The processor P, now sends a mode command to the comparator decoding logic D, via control bus S. The command is to allow 50% and 75% matches (for example) within the comparison process, such that any close matches to the input data will be made aware to the processor P. At the conclusion of this command, decoding logic D via bus $E_2$, signals address counter logic X to start the comparison process at address zero, and increment sequentially at a 1 megahertz rate by virtue of clock pulse J. At this time, address counter logic X starts generating a signal on bus V. With each 1 megahertz clock pulse, the image contained in Memories L is compared with a complete template image stored in Memories R until a predetermined number of partial matches, or an exact match is found. When this condition is reached, the processor P, will read the current address in latches Q1 and Q2 and utilize this address data to compute an index into a read only memory table (not shown).

An ASCII string of characters would reside in the memory table describing the input data, which in turn would be sent to a terminal for human understanding which might read:

"data input is the letter P"

Figure 7:
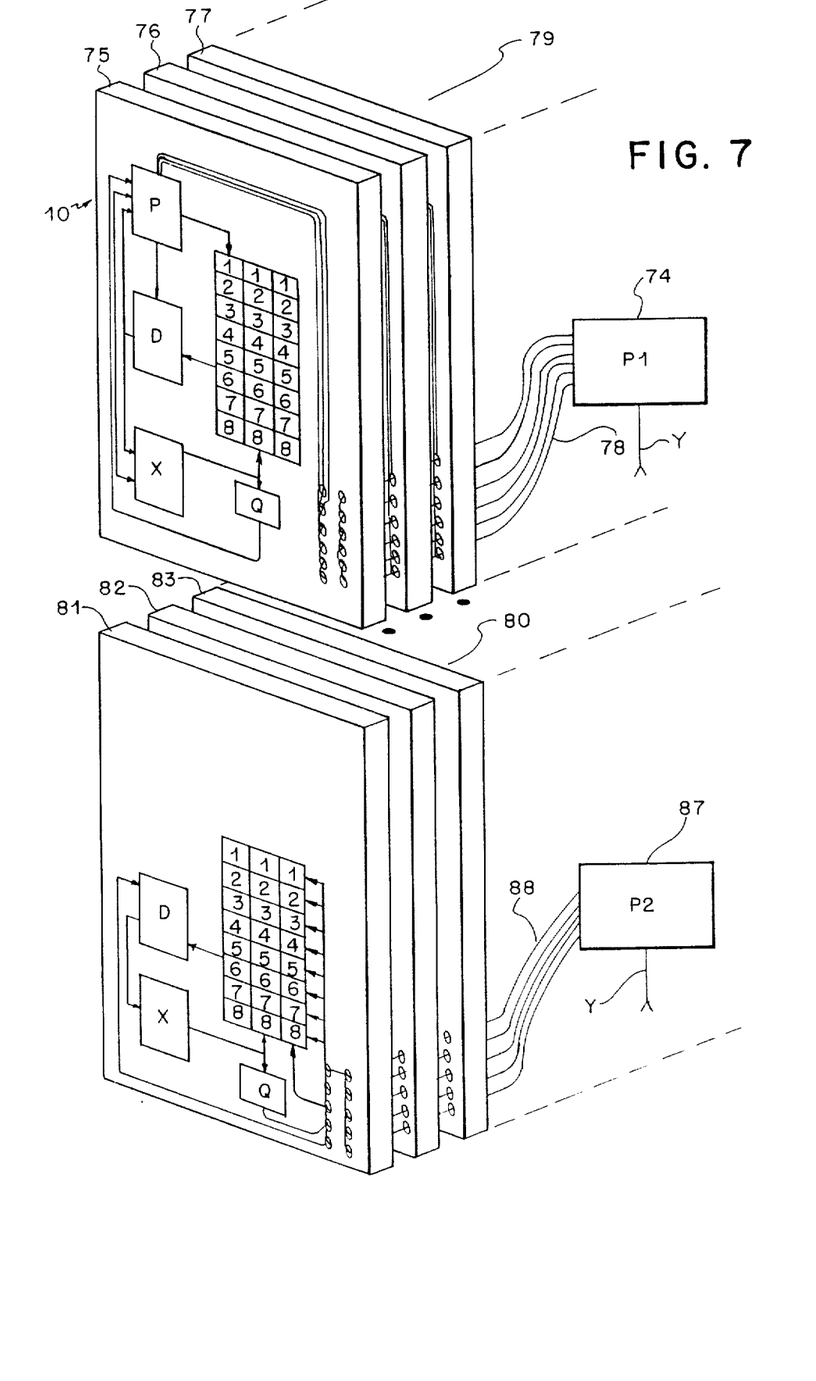
FIG. 7 is a perspective expanded view of two array configurations for the basic computer system architecture shown in FIG. 1.

The same process with variations could apply to Rule Based Knowledge Systems, Sound recognition Systems or many other Comparison Intensive computing tasks. The improvement being one of large amounts of data being compared simultaneously with partial matches; weighing the outcome of comparison process with no processor computation overhead involved. The term Multi, in the term Multi-Dimensional Processing of this invention refers to the fact that FIG. 1 shows a single dimension system. Adding other layered chains to the system as will be hereinafter described with reference to FIG. 7, gives it the Multi-Dimensional Construction. A system using faster components, for instance, a 40 megahertz clock, produces a system capable of scanning through forty million images in the time of one second.

FIG. 3 shows a variable comparator C comprising a EPROM 27512. A EPROM 27512 is a 64 Kilobyte Programmable Read Only Memory, having a 16 bit input address bus and an 8 bit data bus. The 8 address bits are designated A0 thru A7. Likewise, another 8 address bits are designated A8 thru A15. The two least significant data bus connections are designated "D0" and "D1". The following is an explanation of how EPROM 27512 will be used to create a Variable Comparator:

Addresses A0 through A7 are connected to 8 bits of data output from a memory device L holding said data for purposes of "Template Matching," with another source of 8 data bits originating from a "Template" memory device R, which is input to Addresses A8 through A 15. Both groups of bits are compared with each other. In a conventional Comparator, the output of the comparison falls into 1 of 3 categories. Naming the input data "DIN" and naming the template data "DT," gives the following 3 output conditions at the end of a comparison operation:

(1) "DIN" is equal to "DT" (a complete bit for bit match).
(2) "DIN" is less than "DT"("DT" has a higher numeric value than "DIN")
(3) "DIN" is greater than "DT" ("DIN' has a higher numeric value than "DT")

None of these conditions indicate the relative closeness between the two sets of bits. In the case of the Variables Comparator C, which is a programmable device, desired relationships between the two sets of data being compared may be programmed by the system designeer to indicate degrees of "Almost Match," depending upon the particular application at hand.

The output bits of which there are two, "D0" and "D1", may be programmed to output one of four (4) different binary states relating to 65,535 input address combinations. This represents every possible combination of relationship between the input data sets which are impressed upon the address bus, A0 through A15, (the two distinct groups of 8 bits each from the two differing sources, one group being the input data 8 bits, the other group being the reference or "Template" data 8 bits). In this particular example there will be four (4) states of output programmed into the EPROM 27512:

(1) No match (less than 6 bits out of 8 bits match) Binary code of 0.
(2) 75% match (6 bits out of 8 bits match) Binary code of 1.
(3) 87% match (7 bits out of 8 bits match) Binary code of 2.
(4) Exact match (8 bits out of 8 bits match) Binary code 3.

In this fashion, EPROM 27512 is shown to be able to render two different degrees of an "Almost" condition in the comparison process. Thus close or "Almost" matches in a comparison process related to "Image" or "Voice" analysis would not go unseen, as would be the situaiton with a conventional comparator. Variable Comparator C (typical) would be 1 of 8 Variable Comparators C (numbered 1 through 8), as shown in FIG. 1.

Figure 4:
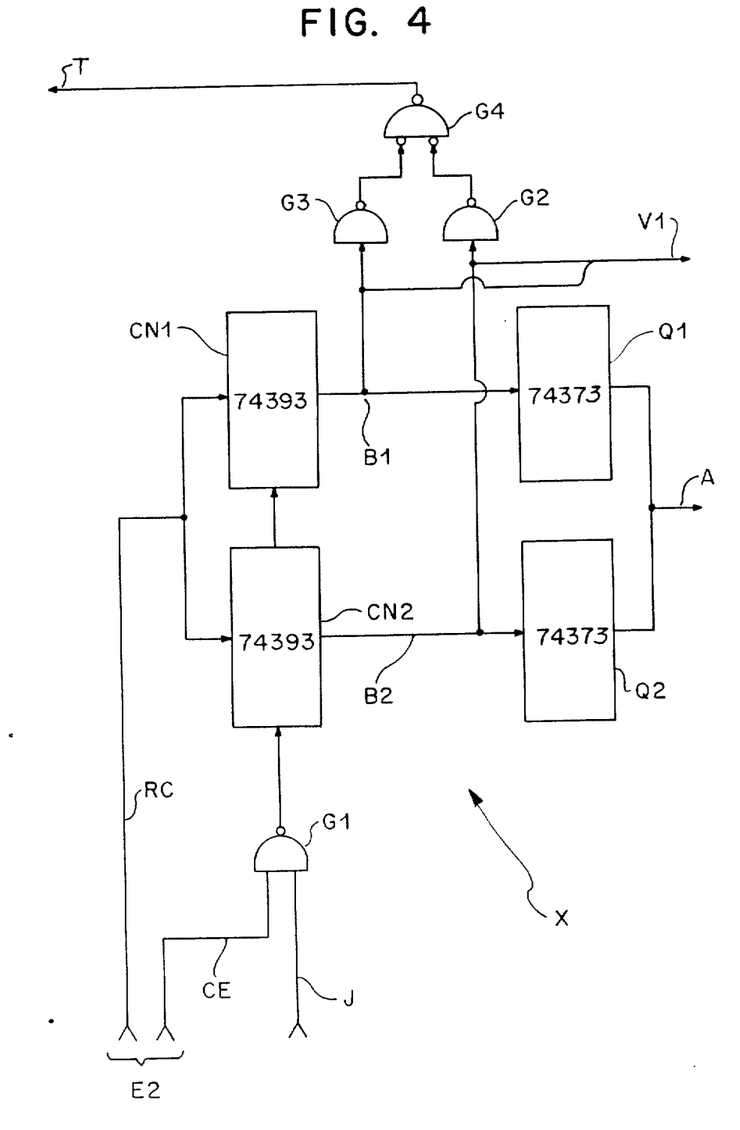
FIG. 4 depicts a decoding logic circuit diagram on greater detail than that shown in FIG. 1.

FIG. 4 is a detailed drawing of address counter logic X of FIG. 1. The address counter logic is configured with currently available integrated circuits as outlined below:

CN1, CN2: 74393 8 bit counter
Q1, Q2: 74373 8 bit latch
G1: 7400 Nand gate
G2, G3: 7430 8 input nand gates
G4: 7432 2 input OR gate A two wire bus E2 emanates from decoding logic D, shown in FIG. 1. Bus E2 is made up of two signals, RC which is a counter reset function for 8 bit counter CN1 and CN2. The second signal in bus E2 is CE which is a clock enable signal which enables passage of clock pulses through gate G1 to counters CN1 and CN2. Latches Q1 and Q2 are 8 bit, tri-state latches through which the Template memory address is sent to the processor P in FIG. 1, via 16 bit bus A. Gates G2 and G3 are 8 input nand gates, which will each exhibit a logic low on their respective outputs, when all inputs at B1 and B2 are logic high. This condition only occurs when counters CN1 and CN2 have reached their "end-of-address" count. The two input OR gate G4 will exhibit a logic low on its output, when the "end-of-address" condition is met on both of its inputs. The output of gate G4 becomes the "end-of-addresses" state, which is sent to the processor P of FIG. 1, via signal line T. The one megahertz clock pulse J input to gate G1, which is either enabled or inhibited by signal CE, clock enable signal emanating from decoding logic D, shown in FIG. 1. The Template memory address generated by counters CN1 and CN2 which is fed to the Template memories R is carried over bus V1.

Figure 5:
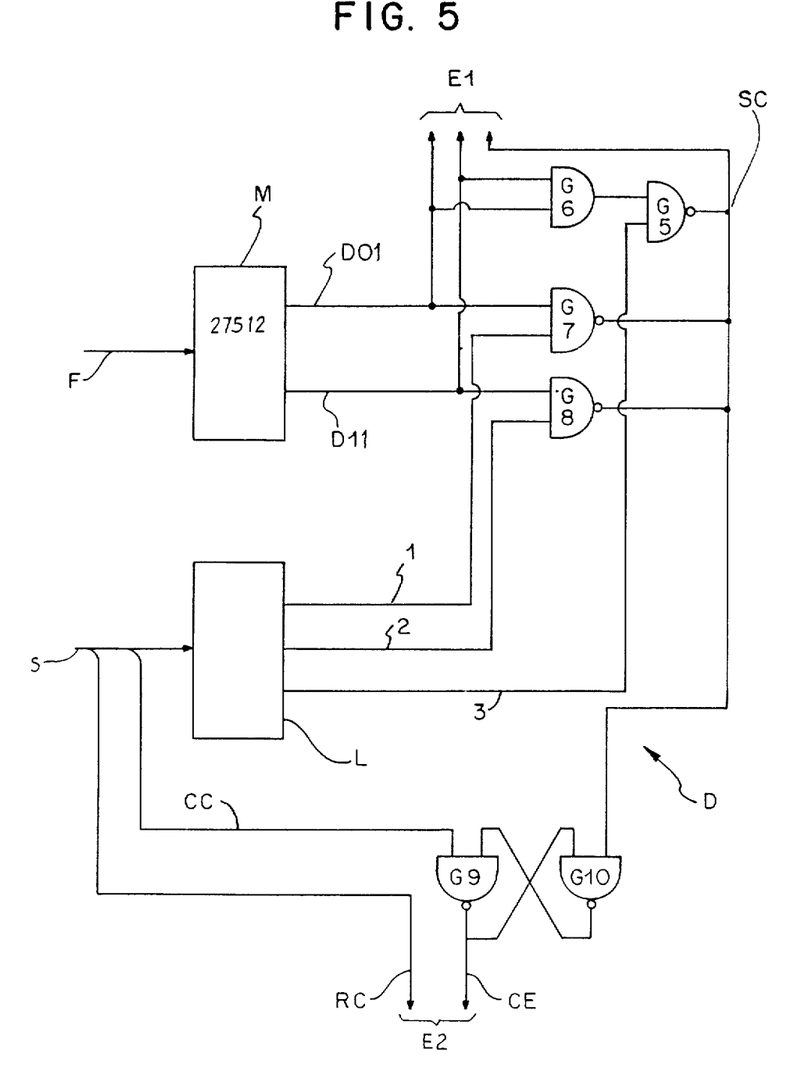
FIG. 5 illustrates a clocked address counter logic circuit diagram in greater detail than that shown in FIG. 1.

FIG. 5 is a detailed drawing of comparator decoding logic D, shown in FIG. 1. As related to FIG. 5, Variable Comparator M is configured with 16 address inputs, shown at input F, and two outputs shown at "D01" and "D11". Input F is derived from the eight (8) two bit outputs of comparators C (numbered 1-8) of FIG. 1. A 4 bit latch L has 4 bits from bus S as its input and three output lines, shown as "1", "2" and "3". The output lines connect to dates G5, G7 and G8, and act as enable/inhinit controls for gate G5. Latch L outputs "1", "2" and "3", and comparator M outputs "D01" and "D11", togehter with gates G5, G6, G7 and G8 are wired as combinatorial logic such that signal "SC" will go to logic low, according to the contents of Latch L, and the inputs to Variable Comparator M, shown at input F. Latch L is loaded from processor P, as shown on FIG. 1, via bus S. The data loaded into latch L will determine which output conditions of Variable Comparator M will allow the stopping of the Comparison process by way of signal "SC" (STOP CLOCK), which connects to Address Counter Logic X, as shown on FIG. 1 via bus E2. The signal "SC" is a Stop Clock logic low, which when asserted will inhibit further passage of the 1 megahertz clock pulses J through gate G1, as shown in FIG. 4. This action will halt the comparison process and allow the system processor P shown on FIG. 1 to examine the state of comparison via bus E1, and determine whether the "EXACT" match, or 50% match, or 80% match has been found in Template Memeory R. The processor P then will decide whether to continue the comparison process by asserting signal "CC" shown in FIG. 5, to produce a high logic level signal "CE" on gate G9, which in turn connects to Counter Clock pulse Control Gate G1, as shown in FIG. 4. Latch L output "1" will either enable or inhibit a 50% match condition to assert signal "SC". Latch L output "2" will do the same for an 80% match condition. Latch L output "3" will do the same for an "Exact" match condition. Thus the processor P has control over allowing or disallowing the "Almost" condition in comparison operations, or conversely allowing only "Exact" matches to be recognized by the Comparator Decoding Logic D.

Figure 6:
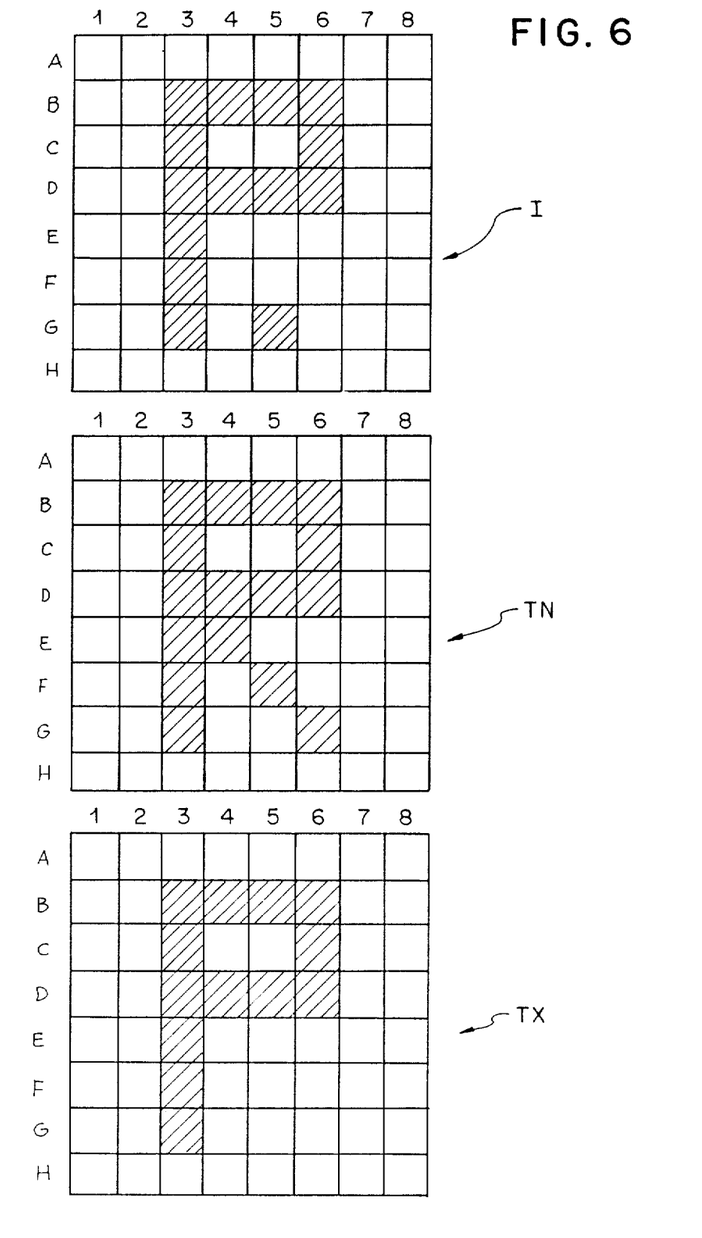
FIG. 6 shows a diagram of three different match conditions for that data depicted in FIG. 2.

Referring to FIG. 6 a detailed explanation of the process of Variable Comparison will be described. "I", "TN" and "TN" represent 8 bit by 8 byte images, as used within a very small computer system 10. The number 1 through 8 represent columns of each image and A through H represent rows of each iamge, thus a particular bit within a byte may be referenced as, for example "G5" located in image "I". The process of Variable Comparison is embodied in the following description: Image "I" is taken as the input to the system 10, the item to be identified. Image "I" is clearly taken to a letter "P" followed by what is probably a period. The period in image "I" will represent an incorrect input to the system, which is only supposed to recognize letters of the alphabet, and not punctuation marks. In our hypothetical system 10 we will program the system to only accept either "EXACT" template matches, or 90% template matches (7 out of 8 bytes match) to be valid outputs. "TN" and "TN" represent template images stored within Read Only Memory of the system 10. with the latter representing a letter "P" and the former representing a letter "R". When the comparison process is initiated, the following events will occur:

No "EXACT" match to input "I" will be found as out templates do not contain punctuaction marks, in this case, a period. However, a 90% match will be found identifying the input as a letter "P", by virtue of the following. Image "TX" is almost an exact replica of image "I" except for the bit "G5", our erroneous period; this condition resulting in 7 out of 8 bytes matching (A, B, C, D, E, F and H) which meets our programmed parameters of either an "EXACT" match, or a 90% matching being a valid output. Thus, the input image "I", has been identified as a letter "P". Image "TN" which has three non-matching bytes (E4, F5 and G6) would result in a no match condition, and would not become a valid output. In a standard fixed type of comparator, without a VARIABLE COMPARISON capability, the input image would have gone unrecognized due to the erroneous bit at "G5 in image "I".

FIG. 7 shows two configurational arrays for implementing a Multi-Dimensional Processing system. Array 79 shows a system employing Multiple Processor P operating as slaves with processor 74, a Master Controlling Processor P1 serving as "Serving Controller." Boards 75, 76 and 77 are three interconnected single circuits 10, as shown in FIG. 1. Bus 78 is an interconnecting bus connecting to circuit boards 75, 76 and 77 by which the control processor P1 communicates with the three slave processors P and thus directs and controls system tasking.

Array 80 shows three single circuit boards 81, 82 and 83 similar to circuit "10" (FIG. 1) with the exception that the three single boards 81, 82 and 83 are devoid of a resident processor P. In this configuration, processor 87 is the only processor P2 utilized within the multiple dimension system, and as such manipulates the three boards as if they were input/output devices via interconnecting bus 88. Although only three circuit boards are shown in each example, this is not meant as a limiting number of dimensions, but rather as a pictorial representation of the concept of Multiple Dimensional Processing. Each dimension or circuit board might possible process one part of an overall task, or conversely, each dimension might be operating on a non-related task with respect to its neighbors. In this way, the system offers maximum flexibility in large, comparison intensive data environments.

Having thus described the invention, it should be obvious to the skilled practitioner in this art, that bit, byte and image size is not limited to the sizes set forth herein, which sizes where intentionally kept to small numbers (eight) for the sake of clarity and brevity, and as such, are merely exemplary.

What is desired to be protected by Letters Patent is presented by the subsequently appended claims.

What is claimed is:

1. A computer system having improved throughout and speed, comprising:

a processor having a data input and an address/data output;

a first set of memories each having separate data inputs, but sharing common addressing, said first set of memories being operatively connected to said processor;

a second set of template memories containing programmable data;

clocked address counter logic operatively connected to said processor and said template memories for generating sequential addresses for said set of template memories and end-of-address-range signal for said processor;

a set of variable comparators operatively connected with said first and second sets of memories, said variable comparators processing data from said first and second sets of memories and in response thereto, providing a set of data signals including an "almost" match signal; and decoding logic means operatively connected to said set of variable comparators and communicating with said processor and said address counter logic for receiving and decoding said set of data signals and in response thereto, providing comparison signals for said processor and said clocked address counter logic.

2. The computer system of claim 1, further comprising storage means communicating with said clocked address counter logic and said processor for storing a generated address indicative of a match condition in said template memories for interrogation by said processor.

3. The computer system of claim 1, wherein said template memories is selected from a group consisting of: (a) read-only memories, (b) read-write memories, and (c) a combination of read-only and read-write memories.

4. A method of comparing input data or information with stored programmable data or information to provide a programmable "almost" condition therebetween, said method comprising the steps of:

(a) introducing data or information to a memory system operatively connected to a variable comparator means;

(b) comparing said introduced data or information with template programmable data or information via said variable comparator means; and (c) generating signals indicative of one of several possible match conditions, at least one of which is a programmable degree of "almost" condition.

5. The method of claim 4, wherein the steps (b) and (c) further comprise the steps of:

(d) dividing or partitioning groups of imput data or information bits into groups of bytes;

(e) comparing each group of bytes against template data bytes or information bytes contained in template memory; and (f) generating at least two bits indicative of one of at least four match conditions with respect to step (e), at least one of said match conditions being a programmable degree of "almost" condition.

6. The method of claim 5, siad at least four match conditions comprise: (i) identical match, (ii) no match, and (iii) two different "almost" match conditions.

7. The method of claim 5, wherein the step (e) is accomplished by comparing all the bytes simultaneously.

8. The method of claim 5, wherein said template memory consists of a memory selected from a group of: (a) read-only memory, (b) read-write memory, and (c) a combination of read-only and read-write memories.

9. The method of claim 5, wherein step (e) is accomplished by dividing or partitioning said groups of bits into sub-groups of bytes, and comparing all of the bytes of said sub-groups simultaneously.

10. A multi-dimensional processing array having improved computer architecture, comprising:

at least one processor for controlling the flow of data or information;

a series of template storage means containing programmable data or information; and a series of variable comparison means operatively communicating with said at least one processor and respective ones of said template storage means for comparing input data or information with each of said template storage means data or information for generating comparative signals indicative of one of many conditions, at least one of which being a programmable degree of "almost" condition.

11. The multi-dimensional processing array of claim 10, wherein there is one processor fo each comparison means.

12. The multi-dimensional processing array of claim 11, wherein there is one master processor communicating with and controlling all the processors in said array.

13. The multi-dimensional processing array of claim 10, wherein there is one processor for all of said array.

14. The multi-dimensional processing array of claim 10, wherein each said template storage means is selected from a group consisting of: (a) read-only memory, (b) read-write memory, and (c) a combination of read-only and read-write memories.

15. A method of variable comparison of data or information, comprising the steps of:

(a) dividing or partitioning data or information bits into groups of bytes;

(b) comparing each group of bytes against programmable data bytes or information bytes contained in template memory; and (c) generating at least two bits indicative of one of at least four match conditions with respect to step (b), at least one of said match conditions being a programmable degree of "almost" condition.

16. The method of variable comparison of claim 15, wherein said at least four match conditions comprise: (i) identical match, (ii) no match, and (iii) two different "almost" match conditions.

17. The method of variable comparison of claim 15, wherein step (b) is accomplished by comparising all the bytes simultaneously.

18. The method of variable comparison of claim 15, wherein step (b) is accomplished by dividing or partitioning said bits into sub-groups of bytes, and comparing all the bytes of said sub-groups simultaneously.

19. The method of variable comparison of claim 15, wherein said template memory consists of a memory selected from a group of: (i) read-only memory, (ii) read-write memory, and (iii) a combination of read-only and read-write memories.

20. A computer system comprising an architecture for processing data or information to provide a programmable degree of "almost" result, comprising:

a processor for controlling the flow of data or information, input data or information being compared with respect to stored data information in said computer system;

Template storage means containing programmable data or information; and variable comparison means operatively connected to said processor and said template storage means for comparing said input data or information with stored data and information and in response thereto, providing an indication of one of several conditions, one of which being an "almost" condition havinga programmable degree of similarity.

21. The computer system of claim 20, wherein said template storage means is selected from a group consisting of: (ae read-only memory, (b) read-write memory, and (c) a combination of read-only and read-write memories.

22. In the computer system of claim 20, comprising said processor and said memory, the improvement including means communicating with said processor and memory for simultaneously comparing data or information with stored data or information contained in memory independent of processor bus size.

* * * * *